United States Patent [19]
Platt et al.

[11] Patent Number: 5,042,426
[45] Date of Patent: Aug. 27, 1991

[54] AQUARIUM

[76] Inventors: Barbara H. Platt, Lake Plymouth Blvd., Plymouth, Conn. 06782; William M. Mutter, 150 Bristol St., Thomaston, Conn. 06787

[21] Appl. No.: 552,570

[22] Filed: Jul. 3, 1990

[51] Int. Cl.⁵ ............................................. A01K 63/00
[52] U.S. Cl. ......................................................... 119/5
[58] Field of Search .......................................... 119/5, 3

[56] References Cited
U.S. PATENT DOCUMENTS 3,797,459  3/1974  Harris ........................................ 119/5
4,242,573  12/1980  Batliwalls ................................ 219/528

Primary Examiner—Gene Mancene
Assistant Examiner—R. Thomas Price
Attorney, Agent, or Firm—Dallett Hoopes

[57] ABSTRACT

An aquarium has within it an exposed metal surface beneath the water line, the metal surface being electrically connected to ground for the purpose of neutralizing stray electrical charges in the water caused by leakage from electric pumps, heaters or lights, to thereby promote a healthier climate for aquatic life.

5 Claims, 1 Drawing Sheet

AQUARIUM

BACKGROUND OF THE INVENTION

1. Field of the Invention

This invention relates to an aquarium especially designed to promote a healthy environment for aquatic life 2. Description of Related Art including Information Disclosed under §§1.97 to 1.99

A limited search has been made through the Patent and Trademark Office classificaiton system for art pertinent to the present invention and the following patents were developed:

| | |
|---|---|
| 654,138 to Dennett | 4,605,984 to Fiedler |
| 2,753,491 to Legge | 4,664,469 to Sachs |
| 3,379,932 to Legge | 4,680,668 to Belkin |
| 3,797,459 to Harris | |

SUMMARY OF THE PRESENT INVENTION

The Applicants, who are in the tropical fish retail business noted that when healthy fish were transferred to certain tanks in their store, they did in a short time become listless and phlegmatic. Their color changed and some of them died. The bodies of the dead fish were noted to lack the sliminess feel, indicating the absence of the healthy protective coating that keeps away bacteria and parasites.

As with most fish tanks, the ones that had held the dead fish had been equipped with lights, electrical heaters and pumps. As an experiment, the Applicants applied a volt meter across the water of the tank to ground and found that it registered for different tanks in the range of 30-80 volts. The current was small somewhere in the neighborhood of 25-30 microamps. It is theorized that the presence of voltage leaked from various electrical appliances as noted, caused a stress on the fish which ultimately led to their demise.

Faced with this problem, —a problem not noted in the prior art — the Applicants decided to ground the water in the tank. Applicants took an element of stainless steel and submerged it in a tank to a position well below the water line. To this element they connected a wire and the wire to the round ground terminal of an ordinary household grounded receptacle. New fish introduced in the experimental tank stayed healthy. Other fish in other tanks showing the recognizable moribund characteristics noted above perked up and were healthy after the introduction of a similar grounded element into their tanks. It was clear that the applicants had made an invention.

The invention, in summary, is a fish tank having within it an exposed metal surface beneath the water line, the metal surface being electrically connected to ground for the purpose of neutralizing stray electrical charges in the water caused by leakage from electric pumps, heaters or lights, to thereby promote a healthier climate for aquatic life.

BRIEF DESCRIPTION OF THE DRAWINGS

Other features and objects of the invention will be apparent from the following specification and drawings, all of which disclose non-limiting embodiments of the invention. In the drawings.

DESCRIPTION OF THE PREFERRED EMBODIMENT

Figure 1:
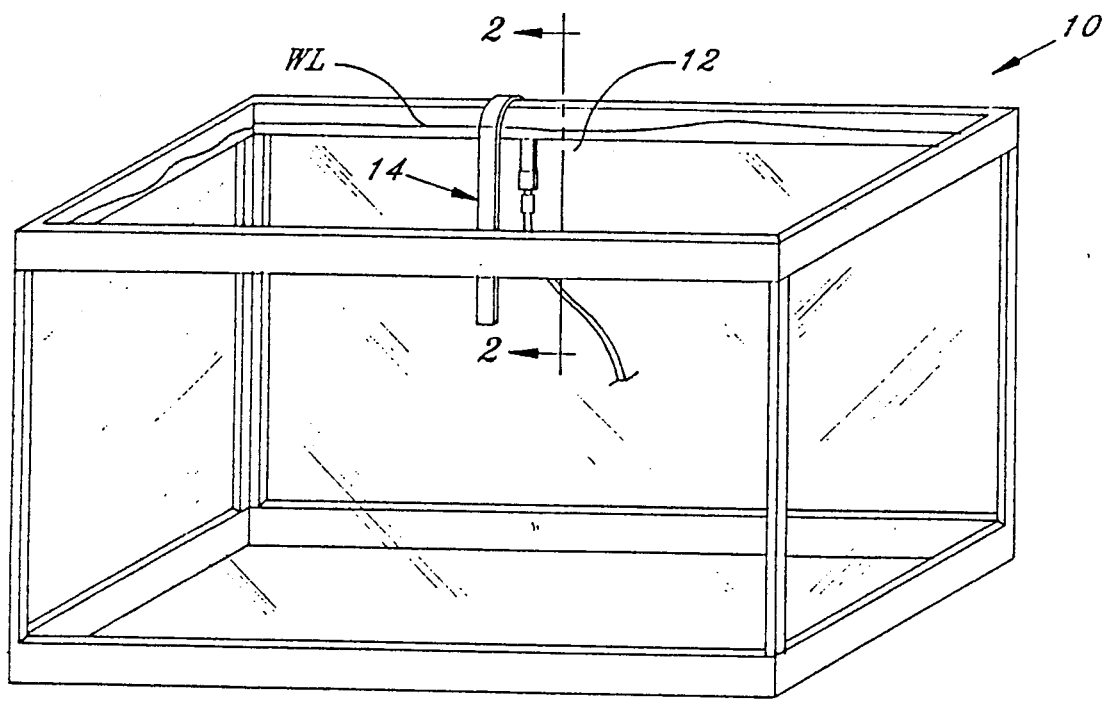
FIG. 1 shows an aquarium having a grounded element embodying the invention.

An aquarium embodying the invention is generally designated 10 in FIG. 1. It is rectangular and has transparent walls including the rear wall 12. The grounding element 14 is generally of J or U-shape having an inner leg 16 and an outer leg 18 with an integral bight 20. in an actual embodiment the element 14 is a strip of ¼ wide stainless steel of sufficient thickness to maintain the shape shown.

As shown, the inner leg 16 may be longer than the outer leg so that is will reach down below the water level WL should it be desired to have a tank less than full.

The end of the outer leg 18 has a solderless connector 22, well known in the art, slipped over it in firm frictional engagement. To the other end of the connector 22 is crimped a wire 24 which may be six feet or so in length. To the other end of the wire is bonded a "banana clip"-type connector 26 which is inserted as shown into the grounded opening GO of a convenient household wall supply receptacle R.

If desired or necessary, the clip 22, the outer leg 18, the bight 20 and the upper portion of the inner leg 16 may be covered with an insulating layer of rubberized coating. At least a couple of inches of the lower end of the inner leg in such a variation is not coated to leave that part of the leg exposed to accomplish the purpose of the element, namely, electrical contact to the water to afford a good ground. A rubberized coating may also cover the outer end of the connector 26 and the adjacent part of the wire to make a more "streamlined"-looking product.

The installation of the device shown is a simple matter. The element 14 is simply hooked over the top of the wall 12 of the aquarium so that a portion of the inner leg 16 sticks below the water line WL. The banana clip 26 is inserted in the circular ground opening of the household grounded receptacle R.

It should be understood that the drawing FIG. 1 does not include the showings of a pump, light or heater which are commonly found asociated with fish tanks and which are the source of the problems resolved by the inventors.

MODIFICATION

Figures 2, 3, 4:
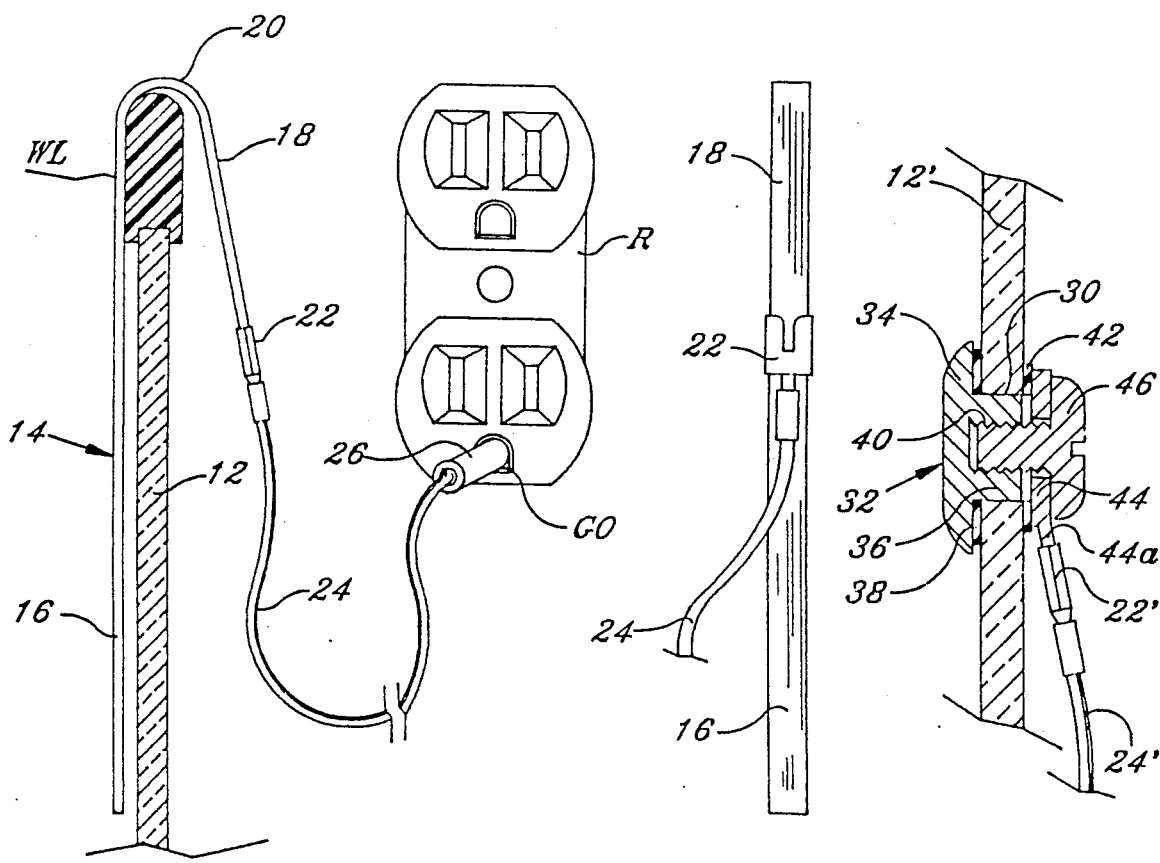
FIG. 2 is a sectional view on the line 2—2 of FIG. 1 and further includes a full showing of a receptacle connection.
FIG. 3 is a rear view of the embodiment of the grounding element shown in FIG. 1.
FIG. 4 is an enlarged sectional view through a modified embodiment of the invention installed in the wall of an aquarium.

A modified form of the invention is shown in FIG. 4 wherein the wall 12' has an opening 30 in it well below the water line inward from the margins of the wall. A grounding element 32 is provided comprising a head 34, a connecting shank 36 and a sealing annulus 38. The shank 36 extends through the opening 30.

The shank, as shown, is drilled and tapped as at 40 from the end opposite the head 34. A resilient annulus 42 surrounds the opening 0 outside the wall. An annular metal connector clip 44 is lined up with the opening 40 and includes a tail 44a. Finally, a headed fastener 46 extends through the clip 44 and is driven into the threaded opening 40 as shown. A solderless connector 42' is connected to the tail 44a and the wire 24' is connected to the grounded opening of a three-wire receptacle (not shown) as in the earlier-described embodiment.

The grounding element 32 is of stainless steel and the fastener 46 and clip 44 may be of brass or other metal.

Provided the modified version of FIG. 4 is installed below the water line, and in good contact with the water, it will ground the water in the tank and obviate stray electric charges in the same manner as the preferred "after-market" embodiment. It is envisioned that the modified version of FIG. 4 would be installed by the fish tank manufacturer as an "original-equipment" item.

Thus, it is clear tha variations of the invention are possible and the invention is not limited to the two embodiments shown. Instead, the invention may be defined by the following claim language and reasonable equivalents thereof.

What is claimed is:

1. An electrically grounded aquarium comprising:
   (a) a tank containing water up to a water line and having a side wall, the side wall having an upper end,
   (b) a U-shaped metal strip having a bight, an inner leg and an outer leg, hooked over the upper end of the side wall with the inner leg extending downward along the inside of the wall to below the water line and in electrical contact with the water, the outer leg extending down the outside of the wall, the outer leg having a lower end,
   (c) a wire electrically connected at one end to the lower end of the outer leg of the strip,
   (d) a generally cylindrical metal plug adapted to fit into the ground receptacle of a household 3-wire grounded receptacle, and connected electrically to an other end of the wire.

2. An electrically grounded aquarium as claimed in claim 1 wherein the strip is of stainless steel.

3. An electrically grounded aquarium as claimed in claim 1 wherein the inner leg is longer than the outer leg.

4. A fish tank having a glass wall having peripheral margins and formed with an opening therein spaced from the margins and beneath the water line, a headed element of metal having a head larger than the opening and a shank extending into the opening with the head on the inside of the tank, resilient sealing means between the element and the glass, means on the outside of the tank for drawing the element outward of the tank to draw the head toward the glass and sealingly compressing the sealing means between the head and the glass, and a means outside the tank connecting the element electrically to ground.

5. An electrically grounded aquarium comprising:
   (a) a tank containing water up to a water line,
   (b) metal means freely hanging in the tank and having at least a portion beneath the surface of the water and in electrical contact with the water.
   (c) a wire electrically connected at one end to the metal means,
   (d) a generally cylindrical metal plug connected electrically to the other end of the wire and fitted into the ground of a household 3-wire grounded receptacle for the purpose of neutralizing stray electrical charges in the water caused by electric pumps, heaters or lights but being separate therefrom to thereby promote a healthier climate for aquatic life.

* * * * *